(12) United States Patent
Evans et al.

(10) Patent No.: US 6,310,932 B1
(45) Date of Patent: Oct. 30, 2001

(54) FRETTING RESISTANT SPRING DESIGN

(75) Inventors: Paul M. Evans, Lexington; Quang M. Nguyen, Immo; John C. Rue, Jr.; Gregory D. Livermore, both of Columbia; Virgil Jamie Vasquez, Lexington, all of SC (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/694,466

(22) Filed: Oct. 23, 2000

(51) Int. Cl.[7] ............................................... G21C 3/18
(52) U.S. Cl. ............................................................ 376/442
(58) Field of Search ..................................... 376/442, 441

(56) References Cited

U.S. PATENT DOCUMENTS

| | | | |
|---|---|---|---|
| 4,396,573 | * | 8/1983 | Feutrel .................................. 376/442 |
| 4,803,043 | * | 2/1989 | DeMario et al. ..................... 376/442 |
| 4,895,698 | * | 1/1990 | DeMario ............................... 376/442 |
| 4,957,697 | * | 9/1990 | Wada .................................... 376/442 |
| 5,243,635 | * | 9/1993 | Bryan ................................... 376/441 |
| 5,444,748 | * | 8/1995 | Beuchel et al. ...................... 376/442 |

FOREIGN PATENT DOCUMENTS

2108996 * 4/1990 (JP) .................................... 376/442

* cited by examiner

*Primary Examiner*—Harvey E. Behrend (57) ABSTRACT

A new spring design for a strap employed in a grid of a nuclear reactor fuel assembly includes a pair of ligaments that each connect with the free portion of the retention plate. The ligaments each are equally spaced a certain distant from the termination of the slots within the strap body. The spring additionally includes a spring contact plate that is wider than the connections of the spring ligaments with the free portion to increase the surface area with which the spring contact plate is in contact with and retains the fuel rod, and thus reduces the contact stresses therebetween. The spring contact plate additionally includes an embossed spring contact member protruding outwardly therefrom reduces the frictional stresses on the fuel rod when it is inserted into and removed from the cell and during vibration of the fuel rod and/or the strap.

20 Claims, 6 Drawing Sheets

FRETTING RESISTANT SPRING DESIGN

BACKGROUND OF THE INVENTION

1. Field of the Invention

The present invention relates generally to nuclear reactor fuel assemblies and, more particularly, is directed to a spring design for a grid of a nuclear reactor fuel assembly. Specifically, the invention relates to an improved spring and dimple configuration for a retention plate of a grid strap.

2. Description of the Related Art

In most pressurized water nuclear reactors, the reactor core is comprised of a large number of elongated fuel assemblies. Conventional designs of these fuel assemblies include a plurality of fuel rods held in an organized array by a plurality of grids that are spaced axially along the fuel assembly length and are attached to a plurality of elongated thimbles of the fuel assembly. The thimbles typically receive control rods or instrumentation therein. Top and bottom nozzles on opposite ends of the fuel assembly are secured to the guide thimbles which extend slightly above and below the ends of the fuel rods.

The grids, as well known in the relevant art, are used to precisely maintain the spacing between the fuel rods in the reactor core, prevent rod vibration, provide lateral support for the fuel rods, and, to some extent, frictionally retain the rods against longitudinal movement. One type of conventional grid design includes a plurality of interleaved straps that together form an egg-crate configuration having a multiplicity of roughly diamond-shaped cells which individually accept the fuel rods and thimbles therein. The straps are configured such that the cells each include a plurality of relatively resilient springs and a plurality of relatively rigid dimples, the springs and dimples being formed into the metal of the interleaved straps and protruding outwardly therefrom. The springs and dimples of each cell frictionally engage or contact the respective fuel rod extending through the cell. Additionally, outer straps are attached together and peripherally enclose the inner straps to impart strength and rigidity to the grid.

Figure 1:
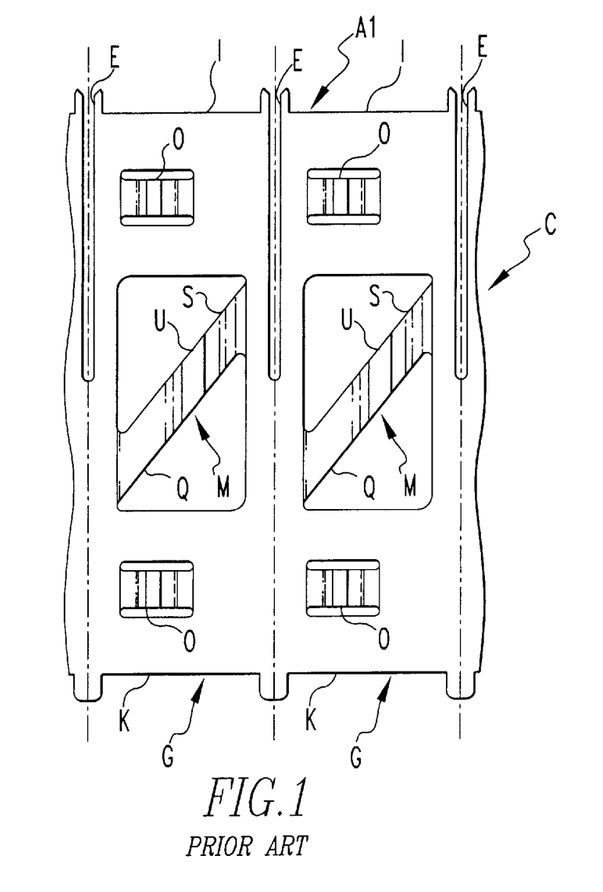
FIG. 1 is a front elevational view of a prior art strap in a "slots up" orientation.
Figure 2:
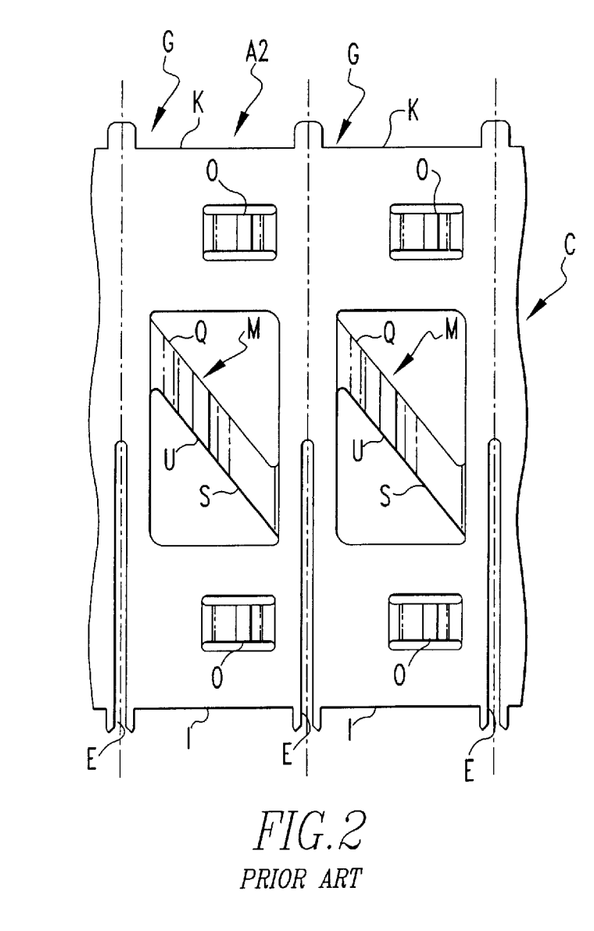
FIG. 2 is a front elevational view of a prior art strap in a "slots down" orientation.

One type of prior art strap is depicted generally at the numeral A1 in FIG. 1 and the numeral A2 in FIG. 2. Straps A1 and A2 are identical but inverted views of identical straps, and thus include identical components. The specific components of the straps A1 and A2 thus will not be differentiated herein. The strap A1 is in a "slots up" orientation and the strap A2 is in a "slots down" orientation.

The straps A1 and A2 each include an elongated strap body C that is formed out of a strip of a sheet metal that is suited to a nuclear environment. The strap body C is formed with a plurality of slots E that are parallel with one another and that extend midway into the strap body C. Each strap body C includes a plurality of retention plates G thereon that are defined on the strap body C between adjacent slots E. Each retention plate G includes a free portion 1 that terminates on opposite sides at the slots E and a connected portion K that is defined within the strap body C and that terminates at imaginary sides that are aligned with the slots E.

A spring M and a pair of dimples O are formed in each retention plate G by stamping and cutting appropriate holes into the strap body C or by other known methods. Each spring M includes a first spring ligament Q, a second spring ligament S, and a spring contact plate U. The spring M is oriented at approximately a 45° angle with respect to a longitudinal axis that extends through the strap body C and that is substantially perpendicular with the slot E.

The first spring ligament Q extends between the connected portion K and the spring contact plate U. The second spring ligament S extends between the spring contact plate U and the free portion 1. The retention plates G are each configured such that the spring M, and particularly the spring contact plate U, protrudes outwardly from the strap body C in a direction generally out of the plane of the paper of the paper of FIGS. 1 and 2. Similarly, the dimples O are configured to extend outwardly from the strap body C in a direction generally into the plane of the paper of FIGS. 1 and 2. The springs M thus protrude outwardly from the strap body C in a direction opposite the dimples O.

When the straps A1 are interleaved with the straps A2 by engaging the slots E of the straps A1 with the slots E of the straps A2, a pair of springs M and two pairs of dimples O protrude into each cell. The springs M, with their first and second spring ligaments Q and S, are generally longer in length than the dimples O, and thus have a smaller spring constant than the dimples O. As such, the springs M are relatively resilient in comparison with the dimples O, which are relatively rigid.

When the fuel rods are inserted into the cells and are in a compressive relation with the springs M and the dimples O protruding into the cell, the springs M, and to an extent the dimples O, are deflected away from the fuel rods and thus impart a residual retaining force against the fuel rods to hold the fuel rods in a given position. It can be seen, however, that since the first spring ligament Q connects with the connected portion K which terminates at an imaginary line within the strap body C, and the second spring ligament S connects with the free portion 1 which terminates at the slots E, the first spring ligament Q will have a higher spring constant and thus will be less resilient than the second spring ligament S. Such differential resilience has a tendency to impart a rotational force to the fuel rod. Such rotational forces have the effect of applying a torque to the fuel rods and of abrading or fretting holes into the fuel rods. Such wear on a fuel rod is preferably avoided due to the potential of releasing radioactive material into the primary cooling loop of the reactor.

In order to reduce the wear on fuel rods, it is thus desired to provided an improved spring design having an even deflection profile in directions both parallel and perpendicular with the longitudinal axis of the strap body. It is also desired to provide an improved spring design that will reduce the surface stress at the interface between the spring contact plate and the fuel rod. It is additionally preferred to configure the new spring design to minimize the abrasion that occurs to the fuel rod when the fuel rod is initially inserted and finally removed from the grid made up of the straps A1 and A2.

SUMMARY OF THE INVENTION

A new spring design for a strap employed in a grid of a nuclear reactor fuel assembly includes a pair of ligaments that each connect with the free portion of the retention plate. The ligaments each are equally spaced a certain distant from the termination of the slots within the strap body. The spring additionally includes a spring contact plate that is wider than the connections of the spring ligaments with the free portion to increase the surface area with which the spring contact plate is in contact with and retains the fuel rod, and thus reduces the contact stresses therebetween. The spring contact plate additionally includes an embossed spring contact member protruding outwardly therefrom reduces the frictional stresses on the fuel rod when it is inserted into and removed from the cell and during vibration of the fuel rod and/or the strap.

Accordingly, an aspect of the present invention is to provide a strap for a grid of a nuclear reactor fuel assembly, the general nature of which can be stated as including an elongated strap body having a longitudinal axis and being formed with at least a first open slot and a second open slot, the at least first open slot extending along a first slot axis and the second open slot extending along a second slot axis, the first and second slot axes being substantially parallel and spaced apart and being oriented substantially perpendicular with the longitudinal axis, the at least first and second open slots each extending from a first edge of the strap body and each terminating at an end point, the end point being less than fully the distance from the first edge to a second and opposite edge of the strap body, the strap body including at least a first retention plate, the retention plate including a free portion and a connected portion, the free portion terminating on alternate sides at the at least first and second open slots, the connected portion terminating on alternate sides at the first and second slot axes within the strap body, with a spring being formed in the at least first retention plate by a first closed spring slot and a second closed spring slot, the spring protruding outwardly from the at least first retention plate in a first direction, and at least a first dimple being formed in the at least first retention plate by a first pair of closed dimple slots, the at least first dimple protruding outwardly from the at least first retention plate in a second direction substantially opposite the first direction, the spring including a first spring ligament, a second spring ligament, and a spring contact plate, the first and second spring ligaments each having a first connection at a first end thereof with the spring contact plate, the first and second spring ligaments each having a second connection with the free portion at a second end thereof, the second connections both being at the same distance from the longitudinal axis, the second connections each having a spring connection length along a direction perpendicular to the longitudinal axis, the spring contact plate having a spring contact length along a direction perpendicular to the longitudinal axis, the spring contact length being greater than the spring connection lengths of either of the second connections.

Another aspect of the present invention is to provide a nuclear reactor, the general nature of which can be stated as including at least a first fuel assembly, the at least first fuel assembly including at least a first fuel rod and at least a first grid, the at least first fuel rod being mounted on the at least first grid, the at least first grid including a plurality of straps, at least one of the straps including an elongated strap body having a longitudinal axis and being formed with at least a first open slot and a second open slot, the at least first open slot extending along a first slot axis and the second open slot extending along a second slot axis, the first and second slot axes being substantially parallel and spaced apart and being oriented substantially perpendicular with the longitudinal axis, the at least first and second open slots each extending from a first edge of the strap body and each terminating at an end point, the end point being less than fully the distance from the first edge to a second and opposite edge of the strap body, the strap body including at least a first retention plate, the retention plate including a free portion and a connected portion, the free portion terminating on alternate sides at the at least first and second open slots, the connected portion terminating on alternate sides at the first and second slot axes within the strap body, a spring being formed in the at least first retention plate by a first closed spring slot and a second closed spring slot, the spring protruding outwardly from the at least first retention plate in a first direction, at least a first dimple being formed in the at least first retention plate by a first pair of closed dimple slots, the at least first dimple protruding outwardly from the at least first retention plate in a second direction substantially opposite the first direction, the spring including a first spring ligament, a second spring ligament, and a contact plate, the first and second spring ligaments each having a first connection at a first end thereof with the spring contact plate, the first and second spring ligaments each having a second connection with the free portion at a second end thereof, the second connections both being at the same distance from the longitudinal axis, the second connections each having a spring connection length along a direction perpendicular to the longitudinal axis, the spring contact plate having a spring contact length along a direction perpendicular to the longitudinal axis, the spring contact length being greater than the spring connection lengths of either of the second connections.

BRIEF DESCRIPTION OF THE DRAWINGS

The preferred embodiment of the invention, illustrative of the best mode in which Applicant has contemplated applying the principles of the invention, is set forth in the following description and is shown in the drawings and is particularly and distinctly pointed out and set forth in the appended Claims.

Similar numerals refer to similar parts throughout the specification.

DESCRIPTION OF THE PREFERRED EMBODIMENT

Figure 3:
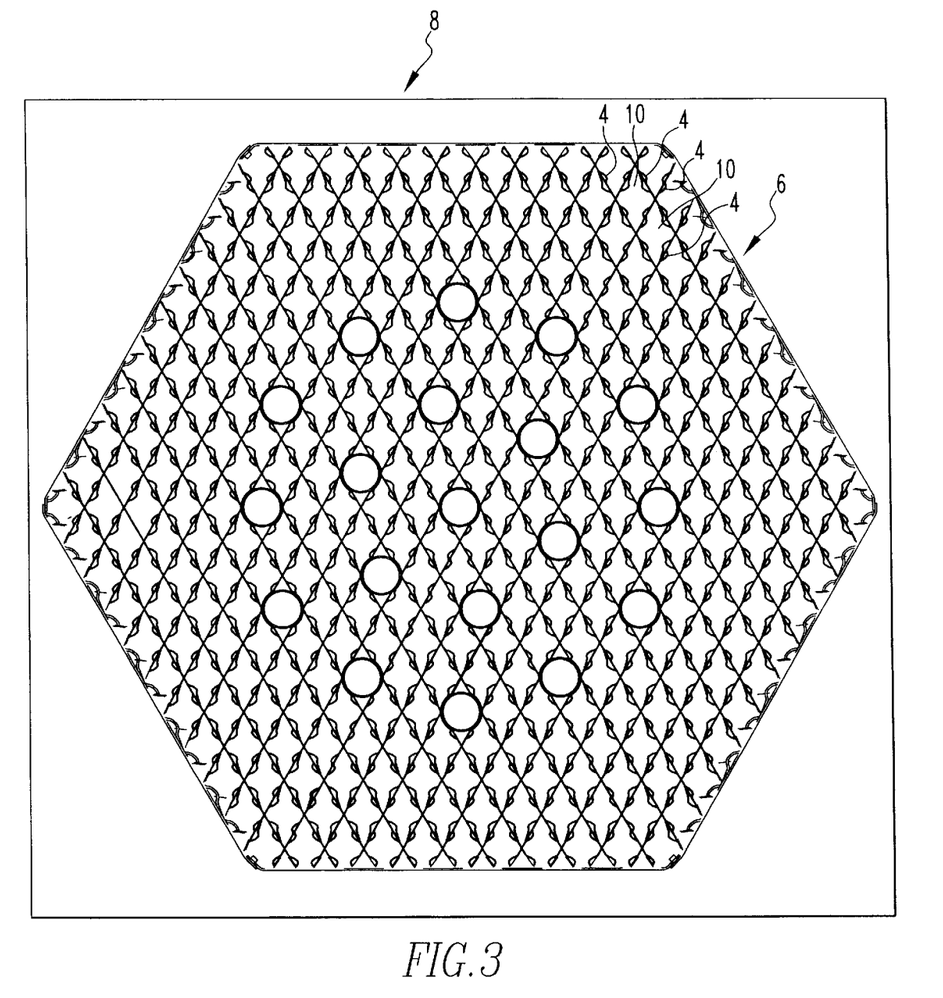
FIG. 3 is a top plan view of a grid of a fuel assembly that incorporates a plurality of straps in accordance with the present invention in a substantially hexagonal configuration within a schematic representation of a nuclear reactor.
Figure 4:
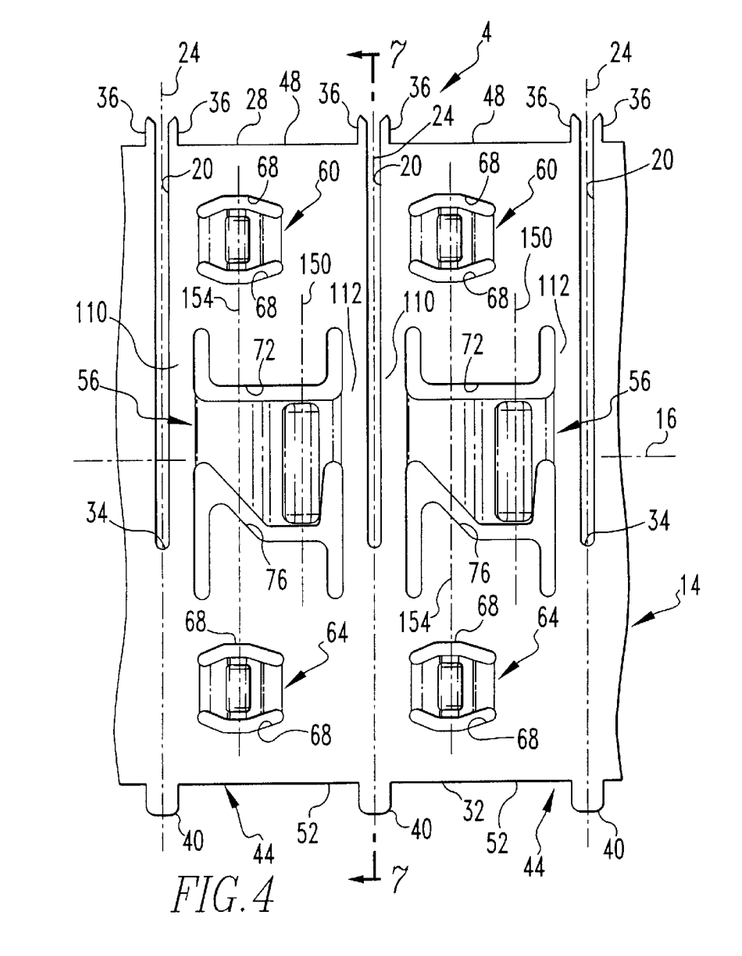
FIG. 4 is a front elevational view of a portion of a strap in accordance with the present invention in accordance with the present invention in a "slots up" orientation.
Figure 4A:
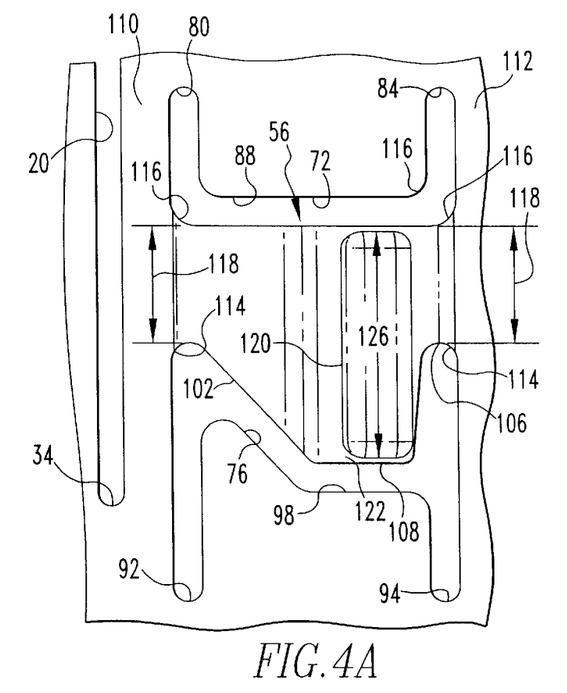
FIG. 4A is an enlarged view of the left central portion of FIG. 4.
Figure 4B:
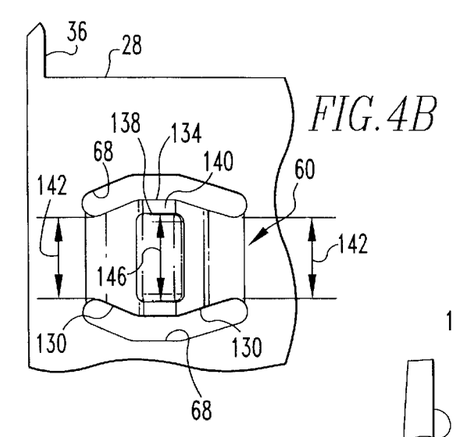
FIG. 4B is an enlarged view of the top left portion of FIG. 4.
Figure 4C:
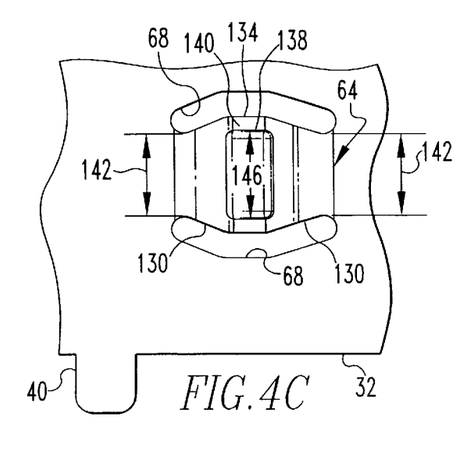
FIG. 4C is an enlarged view of the bottom left portion of FIG. 4.
Figure 5:
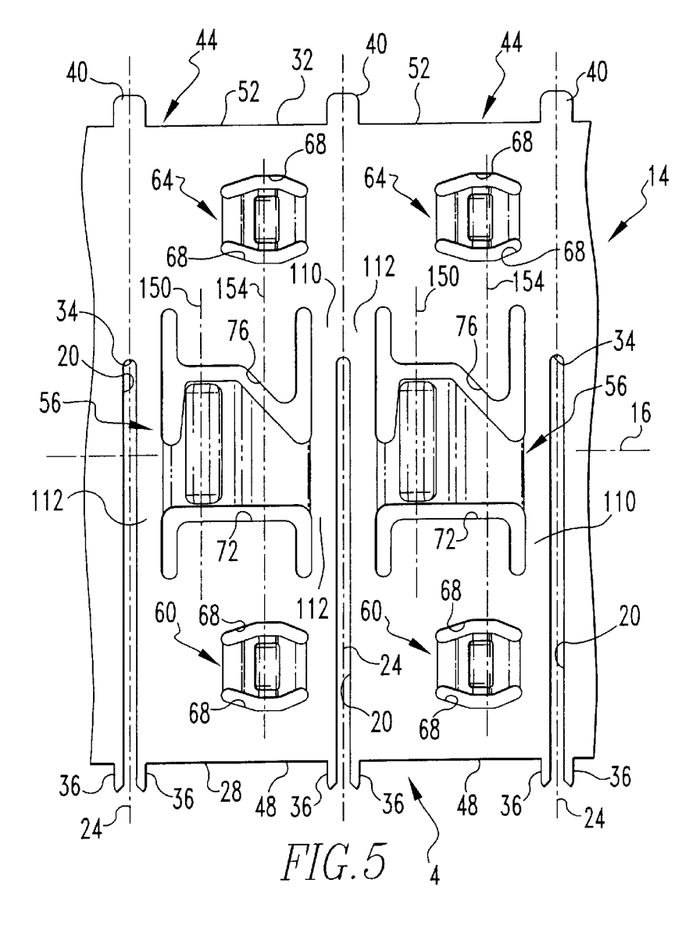
FIG. 5 is a front elevational view of a strap in accordance with the present invention in a "slots down" orientation.
Figure 6:
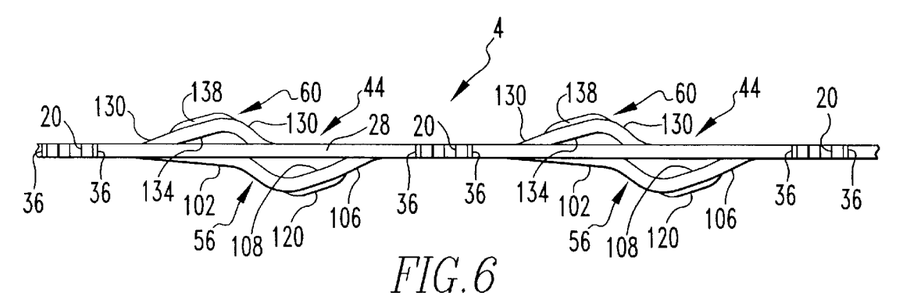
FIG. 6 is a top plan view of the portion of the strap depicted in FIG. 4.
Figure 7:
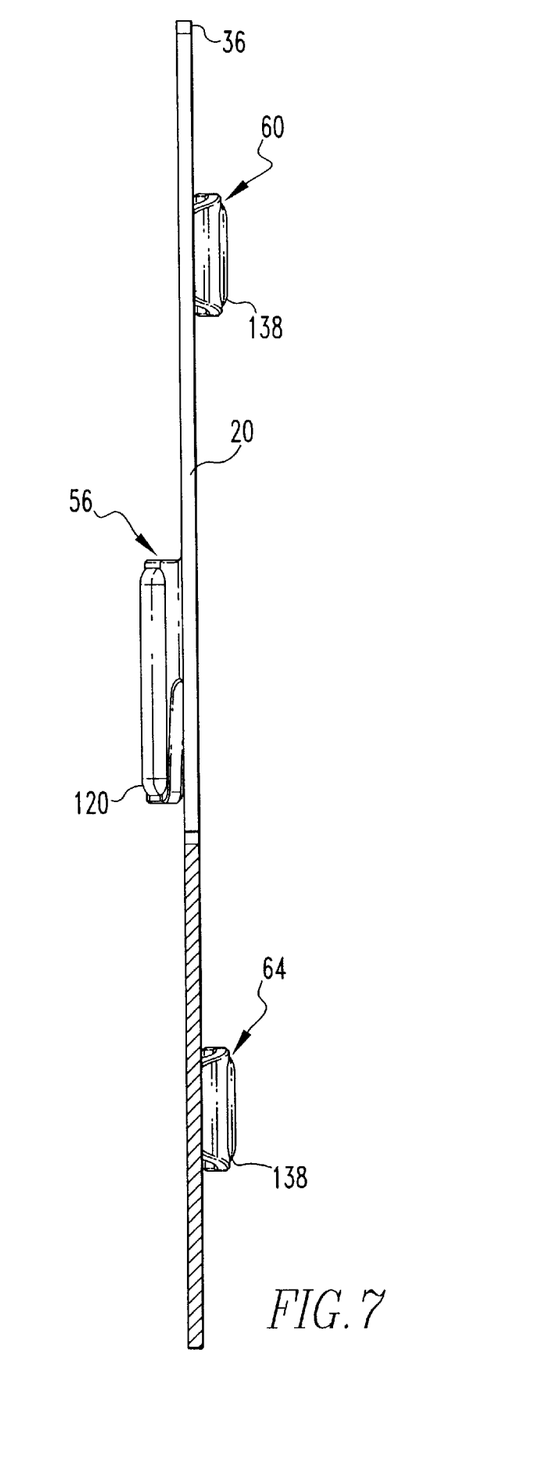
FIG. 7 is a sectional view as taken along line 7—7 of FIG. 4.
Figure 8:
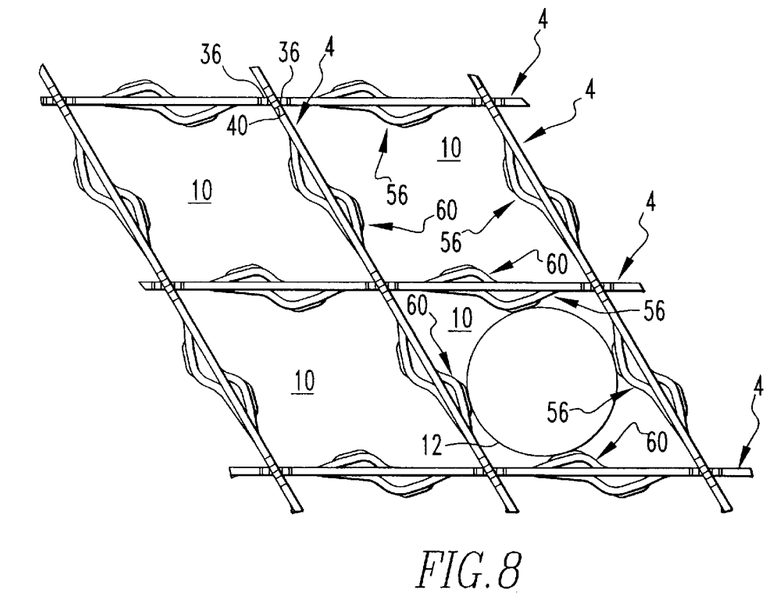
FIG. 8 is a top plan view of a portion of a grid incorporating a plurality of the improved straps and depicting a fuel rod in one of the cells.

A strap in accordance with the present invention is indicated at the numeral 4 in FIGS. 4–8. The strap 4 depicted in FIG. 4 is identical to the strap 4 depicted in FIG. 5, except that the strap 4 in FIG. 4 is in a "slots up" orientation and the strap 4 in FIG. 5 is in a "slots-down" orientation. A plurality of the straps 4 in each of the "slots-up" and "slots-down" orientations are interleaved to formed a grid 6 that is employed in a fuel assembly of a nuclear reactor 8. The grid 6 includes a plurality of cells 10 (FIG. 8) that each carry a fuel rod 12, a thimble tube (not shown), or other device therein, the cells 10 each being roughly diamond-shaped. While FIG. 8 generally depicts a portion of the grid 6 having four cells 10 therein, it is understood that each of the grids 6 employed in the nuclear reactor 8 include substantially more cells 10 than are shown in FIG. 8 and are configured like the grid 6 of FIG. 3.

The straps 4 each include an elongated strap body 14 manufactured out of a sheet metal or other material that is appropriately suited to the reactive environment of a pressurized water nuclear reactor. The strap body 14 includes an imaginary longitudinal axis denoted by the line 16. The strap body 14 is formed with a plurality of open slots 20 that each extend along an imaginary slot axis 24 that is oriented substantially perpendicular with the longitudinal axis 16.

The open slots 20 each extend from a first edge 28 of the strap body 14 in the direction of a second edge 32 of the strap body 14, yet terminate at an end point 34 that is between the first and second edges 28 and 32. For reasons set forth more fully below, it is preferred that the end points 34 be at least nominally closer to the second edge 32 than to the first edge 28, although the end point 34 may be equidistant from the first and second edges 28 and 32 without departing from the spirit of the present invention.

The longitudinal axis 16 is oriented substantially parallel with the first and second edges 28 and 32. A plurality of exterior welding tabs 36 protrude outwardly from the first edge 28 in the plane of the strap body 14, and a plurality of interior welding tabs 40 protrude outwardly from the second edge 32 in the plane of the strap body 14. As is best shown in FIGS. 4 and 5, the exterior welding tabs 36 are disposed on alternate sides of each of the open slots 20, and the interior welding tabs 40 are each centrally disposed along a slot axis 24. As will be set forth more fully below, when a plurality of the straps 4 in the slots up orientation are interleaved with a plurality of the straps 4 in the slots down orientation, the interior welding tabs 40 are each interposed between a pair of the exterior welding tabs 36, and a single weld can thus be applied to a confluence of the interior and exterior welding tabs 40 and 36 to fixedly retain the straps 4 in the desired interleaved configuration.

Each strap body 14 includes a plurality of retention plates 44 that are defined between adjacent slot axes 24. Each retention plate 44 thus includes a free portion 48 that terminates on alternate sides thereof at adjacent open slots 20 and a connected portion 52 that terminates on alternate sides at adjacent slot axes 24 within the strap body 14.

Each retention plate 44 includes a spring 56, a first dimple 60, and a second dimple 60 formed therein. It can be seen that the spring 56 and the first dimple 60 are disposed in the free portion 48, and the second dimple 64 is disposed in the connected portion 52.

The first and second dimples 60 and 64 are each formed by cutting a pair of closed dimple slots 68 in the strap body 14. Similarly, the spring 56 is formed by cutting a first closed spring slot 72 and a second closed spring slot 76 in the strap body 14. The first closed spring slot 72 is roughly U-shaped and includes a pair of compliance slots 80 and 84 that are connected with a connecting slot 88, the connecting slot 88 connecting with one end of each of the compliance slots 80 and 84. The second closed spring slot 76 is of a different configuration than the first closed spring slot 72, yet still includes a pair of compliance slots 92 and 94 that are connected by a connecting slot 98. It can be seen, however, that the connecting slot 98 extends between one end of the compliance slot 92, yet connects with the compliance slot 94 at approximately the midpoint thereof.

The spring 56 includes a first ligament 102, a second ligament 106, and a spring contact plate 108. The first ligament 102 extends between the spring contact plate 108 and a first leg 110 of the free portion 48. The first leg 110 extends in a direction generally transverse to the longitudinal axis 16 and is bounded on one side by one of the open slots 20 and is bounded on the other side by the compliance slots 80 and 92. Similarly, the second ligament 106 extends between the spring contact plate 108 and a second leg 112 of the free portion 48, the second leg extending substantially transverse to the longitudinal axis 16 and being bordered generally by one of the open slots 20 and the compliance slots 84 and 94.

The connections of the first and second ligaments 102 and 106 with the first and second legs 110 and 112, respectively, each begin at a proximate point 114 with respect to the end point 34 and terminate at a distal point 116 with respect to the end point 34. The distal point 116 is farther away from the end point 34 than the proximate point 114, and the distance between the proximate point 114 and the distal point 116 is the spring connection length 118, which is measured in a direction substantially perpendicular with the longitudinal axis 16.

The proximate points 114 are each preferably the same distance away from the end points 34. Similarly, the distal points 116 are equally spaced from the end points 34. While it is preferred that the distance between the end points 34 and the proximate points 114 be at least one-half the spring connection lengths 118 to provide compliance to the first and second ligaments 102 and 106, the aforementioned distance may be less than one-half depending upon the specific needs of the particular application without departing from the spirit of the present invention. Such identity between the connections of the first and second ligaments 102 and 106 with the first and second legs 110 and 112, respectively, of the free portion 48, gives the first and second ligaments 102 and 106 equal spring constants when deflected during use by a fuel rod 12 or during vibration or other movements within the nuclear reactor 8. In this regard, it is understood that the term "spring constant" when used in relation to the first and second ligaments 102 and 106 refers to the overall deflection characteristic of the first and second ligaments 102 and 106 during deflection of the spring 56, and thus additionally includes or incorporates the deflection characteristics of the first and second legs 110 and 112 as well as that of other appropriate elements of the reactor 8. While other configurations of the spring 56 are possible in which the first and second ligaments 102 and 106 have non-identical connections with the first and second legs 110 and 112, respectively, it is preferred that the first and second ligaments 102 and 106 nevertheless be configured to have equal spring constants in order to provide an even deflection profile both in the both longitudinal and transverse directions and to resist imparting rotative forces to the fuel rod 12, as will be set forth more fully below.

The spring contact plate 108 includes a spring contact member 120 that is an embossment protruding outwardly from a spring border 122, the spring border 122 being the portion of the spring contact plate 108 that has not been embossed outwardly to form the spring contact member 120. The spring contact member 120 is a portion of the spring contact plate 108 that comes into physical contact with the fuel rod 12. The spring contact member 120 thus is of a spring contact length 126 measured in a direction substantially perpendicular with the longitudinal axis 16.

The spring contact length 126 is advantageously greater than the spring connection lengths 118 to reduce the stresses imparted by the spring contact member 120 on the fuel rod 12. More specifically, by providing an extended or enlarged spring contact member 120 having an expanding spring contact length 126 in comparison with the spring connection lengths 118, the retention force imparted by the spring 56 to the fuel rod 12 is distributed across the contact area between the spring contact member 120 and the fuel rod 12, and by increasing the area of the spring contact member 120, as evidenced by the enhanced spring contact length 126, the stresses imparted by the spring 56 to the fuel rod 12 are relatively reduced. Not only is the normal force between the spring contact member 120 and fuel rod 12 distributed over a relatively greater area and thus the normal stresses are correspondingly reduced, but any stresses resulting from frictional forces due to sliding or vibration of the fuel rods 12 with respect to the grid 6 are likewise reduced. Such reduced stresses advantageously diminish the likelihood of abrasion or fretting of the fuel rods 12, with consequent reduction in the likelihood of fretting failure of the fuel rods 12.

The spring contact member 120 is advantageously embossed to have curved or arcuate upper and lower edges to resist digging by the edge of the spring contact plate 108 into the fuel rod 12 during installation and removal of the fuel rod 12 in the cell 10 (FIG. 7.) Moreover, the side edges of the spring contact member 120 are likewise curved to reduce such digging or gouging by the side edges during vibration of the reactor 8 or in the event of other movement phenomena (FIG. 6.) Additionally, it can be seen that by providing both a spring border 122 as well as a spring contact member 120 embossed outwardly therefrom, the spring border 122 provides strength in directions transverse to and parallel with the longitudinal axis 16, which resists deflection of and damage to the spring contact member 120 when the fuel rod 12 is initially installed and ultimately removed from the nuclear reactor 8 in the transverse direction.

Each of the first and second dimples 60 and 64 include a pair of dimple ligaments 130 and a dimple contact plate 134. The dimple ligaments 130 of the first dimple 60 extend between the dimple contact plate 134 and the free portion 48. Similarly, the dimple ligaments 130 of the second dimple 64 extend between the associated dimple contact plate 134 and the connected portion 52.

The pair of dimple ligaments 130 of the first dimple 60 are each disposed an equal distance from the first edge 28 and are each of an equal dimple connection length 142 with the free portion 48 to provide equal spring constants and a constant deflection profile in both the longitudinal and transverse directions. Similarly, the dimple ligaments 130 of the second dimple 64 are each disposed an equal distance away from the second edge 32 and are each of an equal dimple connection length 142 with the connected portion 52 to provide equal spring constants and an equal deflection profile in both the longitudinal and transverse directions.

Each of the dimple contact plates 134 includes a dimple contact member 138 that is an embossment protruding outwardly from a dimple border 140, which is the portion of the dimple contact plate 134 that is not embossed outwardly to form the dimple contact member 138. The dimple contact member 138 is preferably configured with rounded or arcuate upper and lower edges to resist the edge of the dimple contact plate 134 from gouging the fuel rod 12 during installation and removal of the fuel rod 12 from the cell 10. The dimple contact member 138 is the portion of the dimple contact plate 134 that is physically in contact with the fuel rod 12, and is of a dimple contact length 146, measured in a direction substantially perpendicular with the longitudinal axis 16. The connections of the dimple ligaments 130 of the first dimple 60 are of a dimple connection length 142 measured in a direction substantially perpendicular to the longitudinal axis 16 that is less than the associated dimple contact length 146 of the dimple contact plate 134 thereof. Similarly, the dimple ligaments 130 of the second dimple 64 are of a dimple connection length 142 measured in a direction substantially perpendicular to the longitudinal axis 16 that is less than the associated dimple contact length 146 of the dimple contact plate 134 thereof.

As can be seen in FIGS. 6 and 7, the spring 56 and the first and second dimples 60 and 64 protrude outwardly from the plane of the strap body 14 in order to operatively engage the fuel rods 12. More specifically, the springs 56, as depicted in FIGS. 4 and 5, protrude in a direction generally out of the plane of FIGS. 4 and 5, and the first and second dimples 60 and 64 protrude in a direction opposite the spring 56, and thus extend generally into the plane of FIGS. 4 and 5.

With the springs 56 protruding from the strap body in a first direction and with the first and second dimples 60 and 64 protruding from the strap body 14 in a 30 second opposite direction, it can be seen from FIG. 8 that the spring 56 of any given retention plate 44 protrudes into a cell 10 that is different than the cell 10 into which the first and second dimples 60 and 64 of the same retention plate 44 protrude. As is best shown in FIG. 8, each cell 10 is bordered by four retention plates 44 in a roughly diamond-shaped configuration, with the cell 10 having two springs 56, two first dimples 60, and two second dimples 64 protruding into it. As to any given retention plate 44, the spring 56 thereof protrudes into a given cell 10, and the first and second dimples 60 and 64 thereof protrude into an adjacent cell 10.

As is best shown in FIG. 4 and 5, the dimple contact plates 134 of the first and second dimples 60 and 64 lie along a dimple axis 154 that is substantially perpendicular with the longitudinal axis 16. Similarly, the springs contact plate 108 can be said to lie along a spring contact axis 150 that is oriented substantially perpendicular with the longitudinal axis 16. The spring contact axis 150 and the dimple axis 154 are parallel and spaced from one another. It thus can be seen that the spring contact plate 108 is offset from the dimple contact plates 134 of the first and second dimples 60 and 64 with respect to the longitudinal axis 16. The offset relation between the spring contact plate 108 and the dimple contact plates 134 is further illustrated in FIGS. 6 and 8.

Moreover, as can be seen in FIGS. 6 and 8, the offset relation of the spring contact plate 108 from the dimple contact plates 134 necessitates that the spring contact member 120 be oriented in a direction that is generally non-coplanar with the balance of the strap 4. Similarly, the dimple contact members 138 are generally non-coplanar with the balance of the strap 4.

It can thus be seen that the improved configuration of the retention plate 44 of the present invention, with the improved configurations of the spring 56, the first dimple 60, and the second dimple 64, advantageously results in fewer stresses and stresses of lesser magnitude to the fuel rods 12. Such reduced stresses result in a reduced likelihood of fretting damage to the fuel rods 12 by eliminating or at least substantially reducing the twisting forces applied to the fuel rods 12, by reducing the contact stresses of the springs 56 and first and second dimples 60 and 64 on the fuel rods 12, and by resisting gouging of the fuel rods 12 during installation into and removal from the grid 6.

The "horizontal" nature of the springs 56 and the first and second dimples 60 and 64 obtained by configuring the first and second ligaments 102 and 106 of the spring at the same vertical distance from the first edge 28, and by similarly configuring the dimple ligaments 130 of the first and second dimples 60 and 64 to be of equal distances from the first and second edges 28 and 32, respectively, and by providing identity of the spring connection lengths 118 and dimple connections lengths 142, advantageously results in each of the springs 56 and first and second dimples 60 and 64 having an even deflection profile in directions both parallel with and transverse to the longitudinal axis 16. Moreover, by providing spring contact lengths 126 that are greater than the spring connection lengths 118, and by providing dimple contact lengths 146 that are greater than the dimple connection lengths 142, the springs 56 and first and second dimples 60 and 64 advantageously apply relatively reduced normal contact stresses and consequently reduced frictional stresses to the fuel rods 12. Still additionally, by providing spring contact members 120 and dimple contact members 138 in the form of embossments having curved or arcuate upper end lower edges, the likelihood of the fuel rods 12 being gouged by the springs 56 and the first and second dimples 60 and 64 during installation and removal of the fuel rods 12 into and from the grids 6 is advantageously reduced.

While a particular embodiment of the present invention has been described herein, it is understood that various changes, additions, modifications, and adaptations may be made without departing from the scope of the present invention, as set forth in the following Claims.

What is claimed is:

1. A strap for a grid of a nuclear reactor fuel assembly, the strap comprising:

an elongated strap body having a longitudinal axis and being formed with at least a first open slot and a second open slot, the at least first open slot extending along a first slot axis and the second open slot extending along a second slot axis, the first and second slot axes being substantially parallel and spaced apart and being oriented substantially perpendicular with the longitudinal axis, the at least first and second open slots each extending from a first edge of the strap body and each terminating at an end point, the end point being less than fully the distance from the first edge to a second and opposite edge of the strap body;

the strap body including at least a first retention plate, the retention plate including a free portion and a connected portion, the free portion terminating on alternate sides at the at least first and second open slots, the connected portion terminating on alternate sides at the first and second slot axes within the strap body;

a spring being formed in the at least first retention plate by a first closed spring slot and a second closed spring slot, the spring protruding outwardly from the at least first retention plate in a first direction;

at least a first dimple being formed in the at least first retention plate by a first pair of closed dimple slots, the at least first dimple protruding outwardly from the at least first retention plate in a second direction substantially opposite the first direction;

the spring including a first spring ligament, a second spring ligament, and a spring contact plate, the first and second spring ligaments each having a first connection at a first end thereof with the spring contact plate, the first and second spring ligaments each having a second connection with the free portion at a second end thereof, the second connections both being at the same distance from the longitudinal axis;

the second connections each having a spring connection length along a direction perpendicular to the longitudinal axis;

the spring contact plate having a spring contact length along a direction perpendicular to the longitudinal axis, the spring contact length being greater than the spring connection lengths of either of the second connections.

2. The strap as set forth in claim 1, in which the spring connection lengths of the second connections are equal.

3. The strap as set forth in claim 1, in which the second connections each begin at a proximate point and terminate at a distal point along the free portion, the distal points being farther away from the end points of the at least first and second open slots than the proximate points, the distance between the proximate and distal points of each second connection being the spring connection length thereof, the distances along the first and second slot axes from each of the end points of the at least first and second open slots to the proximate points of the second connections being at least one-half of the respective spring connection lengths.

4. The strap as set forth in claim 1, in which the spring contact plate includes a spring contact member protruding outwardly therefrom, and in which the spring contact length is measured along the spring contact member.

5. The strap as set forth in claim 4, in which the spring contact member is an embossment.

6. The strap as set forth in claim 1, in which the at least first dimple includes a pair of dimple ligaments and a dimple plate, the pair of dimple ligaments each having a first dimple connection at a first end thereof with the dimple plate, the pair of dimple ligaments each having a second dimple connection at a second end thereof with one of the free and connected portions, the second dimple connections both being at the same distance from the longitudinal axis.

7. The strap as set forth in claim 6, in which each second dimple connection is of a dimple connection length along a direction perpendicular to the longitudinal axis, and in which the dimple plate has a dimple contact length along a direction perpendicular to the longitudinal axis, the dimple contact length being greater than the dimple connection lengths of either of the second dimple connections.

8. The strap as set forth in claim 7, in which the dimple plate includes a dimple contact member protruding outwardly therefrom, and in which the dimple contact length is measured along the dimple contact member.

9. The strap as set forth in claim 6, in which the second dimple connections of the at least first dimple are connected with the free portion, and in which a second dimple is formed in the at least first retention plate by a second pair of closed dimple slots, the second dimple protruding outwardly from the at least first retention plate in the second direction, the second dimple including a pair of dimple ligaments and a dimple plate, the pair of dimple ligaments of the second dimple each having a first dimple connection at a first end thereof with the dimple plate and having a second dimple connection at a second end thereof with the connected portion, the second connections of the second dimple both being at the same distance from the longitudinal axis.

10. The strap as set forth in claim 9, in which a dimple axis extends centrally through the dimple plates of the at least first and second dimples and is oriented substantially perpendicular with the longitudinal axis, and in which a spring contact axis extends centrally through the spring contact plate and is oriented substantially parallel with the dimple axis, the dimple axis being spaced along the longitudinal axis from spring axis.

11. The strap as set forth in claim 1, in which the at least first retention plate includes at least a first welding tab extending outwardly from each of the first and second edges.

12. The strap as set forth in claim 1, in which at least one of the first and second closed spring slots is formed with at least a first compliance slot, each compliance slot extending generally in a direction away from the first and second spring ligaments.

13. The strap as set forth in claim 12, in which each of the first and second closed spring slots is formed with a pair of compliance slots.

14. The strap as set forth in claim 1, in which the first spring ligament has a first spring constant and in which the second spring ligament has a second spring constant, the first and second spring constants being equal.

15. A nuclear reactor comprising:
   at least a first fuel assembly, the at least first fuel assembly including at least a first fuel rod and at least a first grid, the at least first fuel rod being mounted on the at least first grid;
   the at least first grid including a plurality of straps, at least one of the straps including an elongated strap body having a longitudinal axis and being formed with at least a first open slot and a second open slot, the at least first open slot extending along a first slot axis and the second open slot extending along a second slot axis, the first and second slot axes being substantially parallel and spaced apart and being oriented substantially perpendicular with the longitudinal axis, the at least first and second open slots each extending from a first edge of the strap body and each terminating at an end point, the end point being less than fully the distance from the first edge to a second and opposite edge of the strap body;
   the strap body including at least a first retention plate, the retention plate including a free portion and a connected portion, the free portion terminating on alternate sides at the at least first and second open slots, the connected portion terminating on alternate sides at the first and second slot axes within the strap body;
   a spring being formed in the at least first retention plate by a first closed spring slot and a second closed spring slot, the spring protruding outwardly from the at least first retention plate in a first direction;
   at least a first dimple being formed in the at least first retention plate by a first pair of closed dimple slots, the at least first dimple protruding outwardly from the at least first retention plate in a second direction substantially opposite the first direction;
   the spring including a first spring ligament, a second spring ligament, and a contact plate, the first and second spring ligaments each having a first connection at a first end thereof with the spring contact plate, the first and second spring ligaments each having a second connection with the free portion at a second end thereof, the second connections both being at the same distance from the longitudinal axis;
   the second connections each having a spring connection length along a direction perpendicular to the longitudinal axis;
   the spring contact plate having a spring contact length along a direction perpendicular to the longitudinal axis, the spring contact length being greater than the spring connection lengths of either of the second connections.

16. The nuclear reactor as set forth in claim 15, in which a second dimple is formed in the at least first retention plate by a second pair of closed dimple slots, the second dimple protruding outwardly from the at least first retention plate in the second direction, the at least first and second dimples each including a pair of dimple ligaments and a dimple plate, each dimple ligament having a first dimple connection at a first end thereof with its respective dimple plate, the pair of dimple ligaments of the at least first dimple each having a second dimple connection at a second end thereof with the free portion, the second dimple connections of the at least first dimple both being at the same distance from the longitudinal axis, the pair of dimple ligaments of the second dimple each having a second dimple connection at a second end thereof with the connected portion, the second dimple connections of the second dimple both being at the same distance from the longitudinal axis.

17. The nuclear reactor as set forth in claim 16, in which each second dimple connection is of a dimple connection length along a direction perpendicular to the longitudinal axis, and in which the dimple plates each have a dimple contact length along a direction perpendicular to the longitudinal axis, the dimple contact lengths of the at least first and second dimples each being greater than the dimple connection lengths of any of the second dimple connections.

18. The nuclear reactor as set forth in claim 17, in which the spring contact plate includes a spring contact member protruding outwardly therefrom, in which the spring contact length is measured along the spring contact member, in which the dimple plates each include a dimple contact member protruding outwardly therefrom, and in which the dimple contact lengths are measured along the dimple contact members.

19. The nuclear reactor as set forth in claim 18, in which the spring contact member and the dimple contact members are each embossments.

20. The nuclear reactor as set forth in claim 15, in which at least one of the first and second closed spring slots is formed with at least a first compliance slot, each compliance slot extending generally in a direction away from the first and second spring ligaments.

* * * * *